No. 705,557. Patented July 29, 1902.
E. BRUCKER.
ROTARY WHEEL HARROW.
(Application filed Sept. 26, 1901.)
(No Model.)
2 Sheets—Sheet 2.
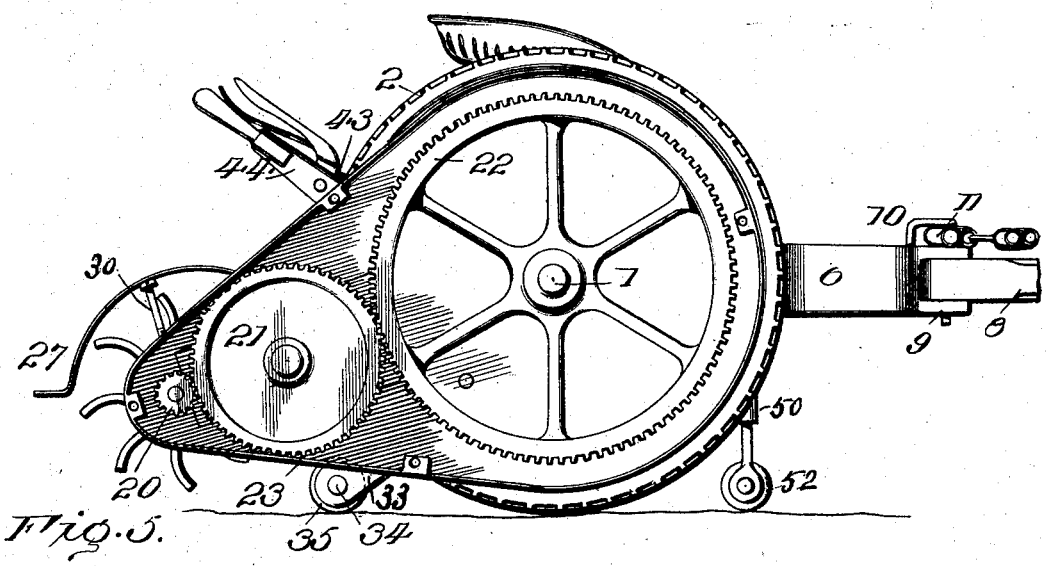
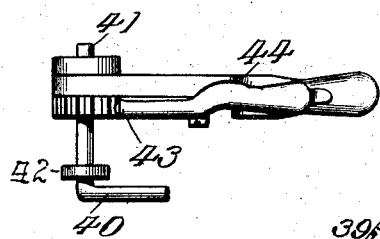
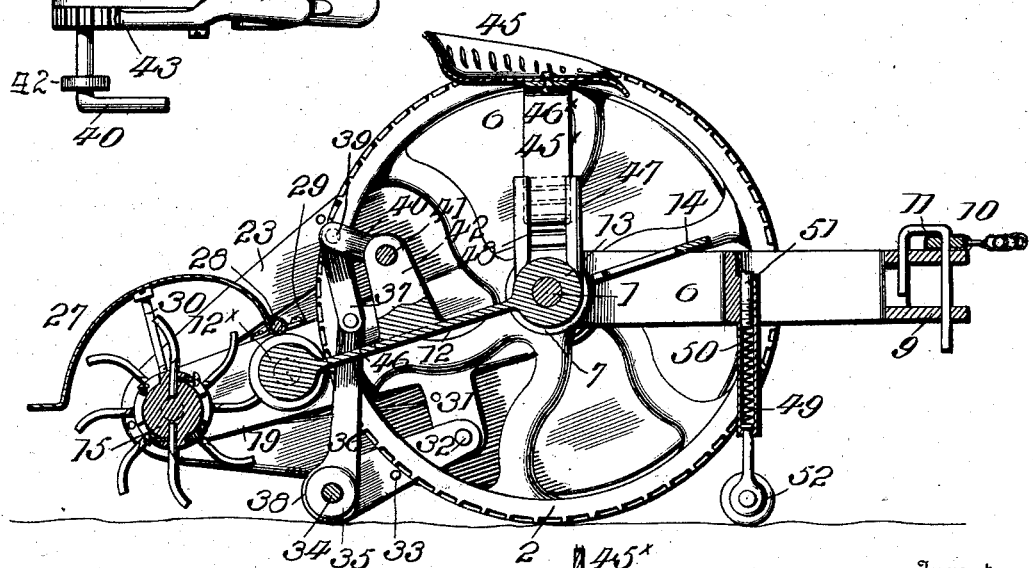
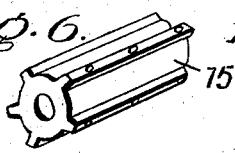
Inventor
E. Brucker
By Benj. R. Catlin
Attorney
Witnesses
C. M. Catlin
A. H. Mateer

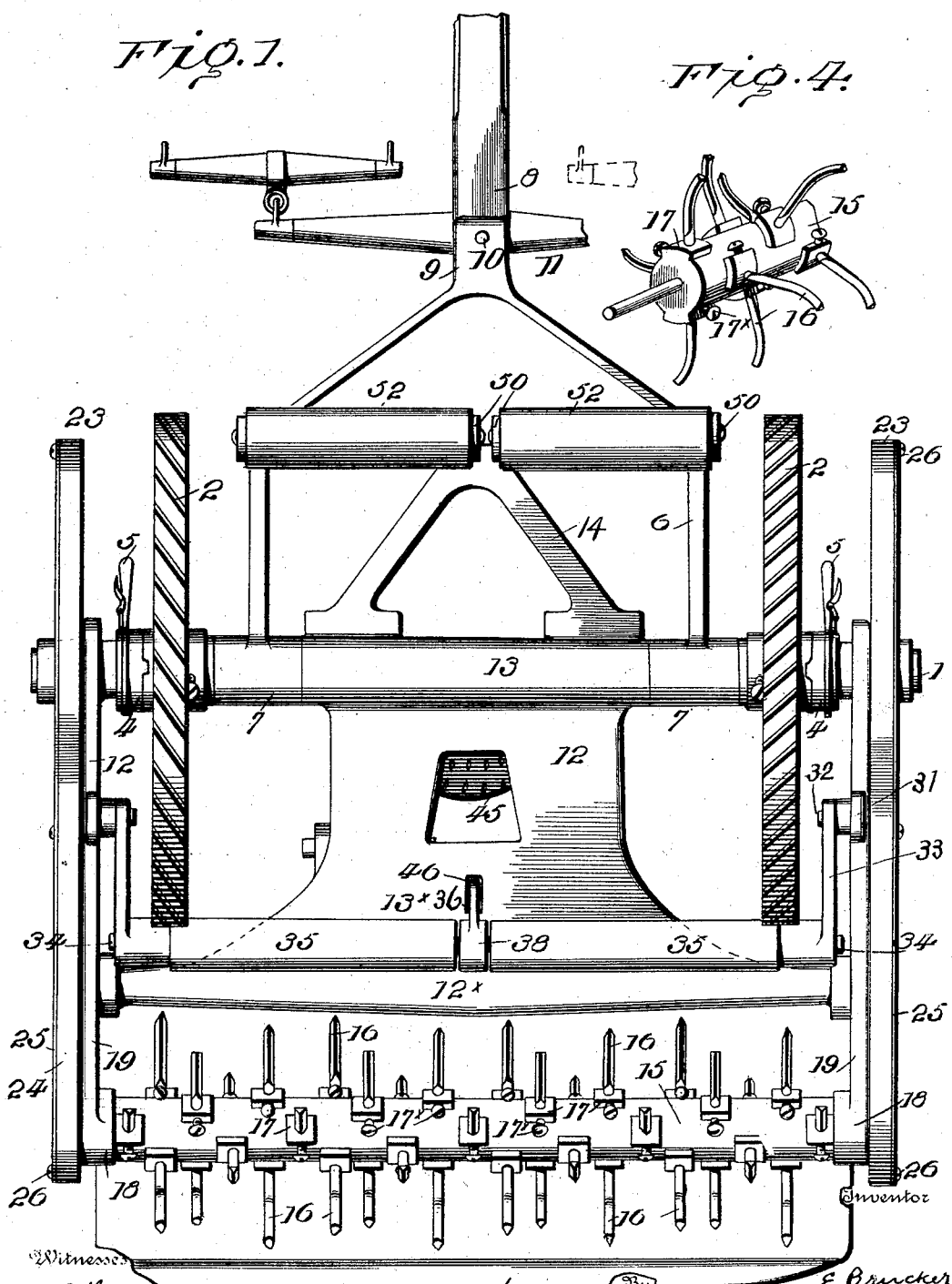

UNITED STATES PATENT OFFICE.

ERNST BRUCKER, OF ROCHESTER, NEW YORK.

ROTARY WHEEL-HARROW.

SPECIFICATION forming part of Letters Patent No. 705,557, dated July 29, 1902.

Application filed September 26, 1901. Serial No. 76,668. (No model.)

*To all whom it may concern:*

Be it known that I, ERNST BRUCKER, a resident of Rochester, in the county of Monroe and State of New York, have invented certain new and useful Improvements in Rotary Wheel-Harrows; and I do hereby declare the following to be a full, clear, and exact description of the invention, such as will enable others skilled in the art to which it pertains to make and use the same.

The invention relates to rotary harrows or pulverizers, and has for its object to increase their efficiency and utility.

The invention consists in the construction herein described and pointed out.

In the accompanying drawings, Figure 1 is a bottom plan, and Fig. 2 a side view with a cover removed, of the harrow. Fig. 3 is a longitudinal vertical central section. Fig. 4 is a perspective view of a part of the harrow-roller, and Figs. 5, 6, and 7 show details.

Numeral 1 denotes an axle on which is fixed a wheel 2. This wheel is fixed at will on the axle by means of any suitable clutch 4, having a handle 5.

A seat-frame (denoted by 6) is pivotally supported on the axle by means of sleeves 7. To this frame a tongue 8 can be attached at 9, and at 10 may be secured an evener 11.

12 denotes a harrow-roller frame loosely supported on the axle by means of a sleeve 13. It has an extension or tread 14, whereby the occupant of the seat may operate the frame as a lever, the axle being the fulcrum, to raise the rear end of the frame and the mechanism carried thereby. Said frame comprises a bar 12$^\times$, joining two side members 19 between their ends.

15 denotes the rotatable body or roller of a harrow or pulverizer provided with teeth 16, detachably connected to lugs 17, fixed on the body.

17$^\times$ denotes screws for securing the teeth in the lugs. In the present instance the teeth are shown spirally arranged; but the improvement contemplates a circular arrangement. In Fig. 6 ribs are substituted for the separate lugs, and suitable openings are provided, whereby either the spiral or circular arrangement, or both, may be used.

The roller 15 has journals rotatable in bearings 18 in the side members 19 of the frame 12 and has extensions with bearings in gear-cases. On these journals, outside their bearings and within the cases, are gears or pinions 20, meshing with intermediate gears 21, turning on studs fixed in gear-cases and driven by gears 22, fixed on sleeves attached to the axle, which latter rotates in suitable openings in the gear-cases.

23 denotes the cases inclosing the gears. The cases each comprise a part 24, fixed to the side members 19 of frame 12, and a detachable cover 25, secured by screws 26.

27 denotes a shield having journals 28, rotatable in bearings on the frame 12, said bearings comprising the removable upper parts 29.

30 denotes stops to prevent the shield from falling too low. The shield can be turned back at will to allow free access to the harrow.

On the extensions 31 of the side members 19 of frame 12 are studs 32 to loosely support swinging arms 33, in which is pivotally suspended a shaft 34, having fixed thereto rollers 35, adapted to run on the ground. If desired, these rollers may be made long enough to practically fill the space between the arms 33, and they may be used as clod-crushers. These rollers 35 and their supporting parts are used to hold the harrow above the ground and in an inoperative position when desired by means of the links 36 and 37. The former link is loosely connected to the shaft 34 by a sleeve 38. It is also pivoted to the link 37, and the latter is pivoted to a stud 39 on a crank-arm 40 of a short shaft 41, having bearings in posts 42, fixed to the frame 12. One or both of the posts are provided with ratchet-teeth to coact with a holding-pawl 43, carried by a lever 44, fixed to said shaft 41.
The link 36 passes through a slot 46 in the frame 12. Said slot is sufficiently large to allow the link some play; but its front wall is so situated as to limit the forward movement of the link when the lever 44 is thrown back to rotate shaft 41 and its crank-arm and thrust the links downwardly. This operation of the lever forces the rollers 35 upon the ground and lifts the frame 12, thereby raising the toothed roller. The operation can be aided by pressure on the tread 14. The pawl 43 holds the toothed roller in its elevated position until released, whereupon the said roller will drop to the ground unless purposely held.

The seat 45 is adjustably held by supports 45×, entered in suitably-formed posts 47, fixed to sleeves 7 of the frame. The seat is so disposed with respect to the axle that in use the weight of the driver will counterbalance the frame 6 and hold it approximately in a horizontal plane. This relieves the team from its support.

The posts 47 may, if desired, be provided with a series of notches 48, adapted to receive the end of the supports 45× at different levels, whereby the height of the seat may be adjusted. In some cases the seat-supports will be made of springs. One form of such spring-supports is indicated at 46× in Fig. 3.

If desired, springs 49 can be employed to normally hold the frame 6 level and adapted to return it to a horizontal position when temporarily moved to either side thereof. In such case the seat will be situated immediately over the axle.

Springs 49 are preferably mounted in holder-tubes 50, at the top of which is an adjusting-screw 51. Below the tubes are rollers 52. When the machine is in use, these front rollers may, if desired, be utilized to level the ground and crush clods. I prefer to use these rollers, (one or more,) but do not consider them essential.

Having thus described my invention, what I claim as new, and desire to secure by Letters Patent, is—

1. In a wheeled harrow, an axle, a roller-carrying frame loosely supported on the axle, a toothed roller having journals in the rear end of the frame, and means for raising the frame to lift the said roller above the ground, said means comprising a rotatable roller-shaft having bearings in arms pendent from said frame and situated in front of the toothed roller.

2. In a wheeled harrow, an axle, a roller-carrying frame loosely supported on the axle, a toothed roller having journals in the rear end of the frame, means for raising the frame to lift the said roller above the ground, said means comprising a rotatable roller-shaft having bearings in arms pendent from said frame and situated in front of the toothed roller, and the links, lever and holding-pawl situated immediately over the said roller-shaft.

3. In a wheeled harrow, an axle, a toothed roller, a roller-carrying frame loosely supported on the axle, and means for raising the frame to lift the said roller above the ground, said means comprising a rotatable roller-shaft having bearings in arms pendent from said frame, and the links, lever and holding-pawl, one of said links passing through the frame and limited as to its forward movement thereby.

4. In a wheeled harrow, the axle, the toothed roller, the roller-frame having side members loosely sleeved on the axle, the shield pivotally supported on said members, and the stops 30 to limit the fall of the shield.

5. In a wheeled harrow, the axle, the toothed roller, the roller-frame loosely supported on the axle and having side members, a bar joining said members, a gear on the axle, a gear on the roller, an intermediate gear, a case for the gears, and a stud in the case to rotatably support said intermediate gear.

6. In a wheeled harrow, the axle, the roller-frame having the side members, the seat-frame, the axle-wheels, and the gears on the axles, said frames having sleeves which together with the wheel-hubs cover the axle between its gears.

In testimony whereof I have signed this specification in the presence of two subscribing witnesses.

ERNST BRUCKER.

Witnesses:
JOHN M. KELLER,
JOHN SPINNER.